(12) United States Patent
Coutu

(10) Patent No.: US 11,905,888 B2
(45) Date of Patent: Feb. 20, 2024

(54) MULTI-ENGINE SYSTEM AND POWER TRANSFER BETWEEN ENGINES THEREOF

(71) Applicant: PRATT & WHITNEY CANADA CORP., Longueuil (CA)

(72) Inventor: Daniel Coutu, Longueuil (CA)

(73) Assignee: PRATT & WHITNEY CANADA CORP., Longueuil (CA)

( * ) Notice: Subject to any disclaimer, the term of this patent is extended or adjusted under 35 U.S.C. 154(b) by 222 days.

(21) Appl. No.: 17/390,205

(22) Filed: Jul. 30, 2021

(65) Prior Publication Data

US 2023/0034946 A1    Feb. 2, 2023

(51) Int. Cl.

| F02C 7/32 | (2006.01) |
|---|---|
| B64C 27/12 | (2006.01) |
| B64D 27/10 | (2006.01) |
| F01D 15/10 | (2006.01) |
| F02C 6/02 | (2006.01) |

(52) U.S. Cl.
CPC .............. *F02C 7/32* (2013.01); *B64C 27/12* (2013.01); *B64D 27/10* (2013.01); *F01D 15/10* (2013.01); *F02C 6/02* (2013.01); *F05D 2220/329* (2013.01); *F05D 2220/76* (2013.01); *F05D 2240/60* (2013.01); *F05D 2260/4023* (2013.01); *F05D 2260/4031* (2013.01)

(58) Field of Classification Search
None
See application file for complete search history.

(56) References Cited

U.S. PATENT DOCUMENTS

| 2,723,531 | A |   | 11/1955 | Wosika et al. |
|---|---|---|---|---|
| 3,782,223 | A | * | 1/1974 | Watson ................... B64C 27/32 74/661 |
| 4,270,408 | A |   | 6/1981 | Wagner |
| 6,042,499 | A | * | 3/2000 | Goi ......................... B64C 27/12 475/214 |
| 7,296,767 | B2 | * | 11/2007 | Palcic ..................... B64C 27/82 244/17.11 |
| 8,169,100 | B2 | * | 5/2012 | Dooley ..................... F02C 7/36 290/31 |

(Continued)

FOREIGN PATENT DOCUMENTS

| EP | 2602458 | 6/2013 |
|---|---|---|
| EP | 2963247 | 1/2016 |

*Primary Examiner* — Kayla Mccaffrey
(74) *Attorney, Agent, or Firm* — NORTON ROSE FULBRIGHT CANADA LLP

(57) ABSTRACT

A multi-engine system for an aircraft, has: a first engine having a first output shaft, a first core shaft, and a first electric machine drivingly engaged by the first output shaft or the first core shaft; a second engine having a second output shaft, a second core shaft, and a second electric machine drivingly engaged to the second core shaft; a reduction gearbox drivingly engaged by the first output shaft and by the second output shaft for driving a common load; and a transmission path between the first engine and the second engine, the transmission path being independent from the reduction gearbox and being one or more of: a torque-transfer connection between the second core shaft and the first core shaft or the first output shaft via a coupling gearbox, and an electrical connection between the generator and the electric motor to transmit electrical power to the electric motor.

20 Claims, 5 Drawing Sheets

(56) References Cited

U.S. PATENT DOCUMENTS

| | | | |
|---|---|---|---|
| 8,939,399 B2* | 1/2015 | Kouros | B64D 27/24 |
| | | | 244/17.11 |
| 9,429,077 B2* | 8/2016 | Morgan | F01D 15/10 |
| 10,040,566 B2* | 8/2018 | Waltner | B64D 31/06 |
| 10,400,858 B2 | 9/2019 | Mitrovic et al. | |
| 10,850,863 B2 | 12/2020 | Bisson et al. | |
| 10,961,915 B2* | 3/2021 | Simonetti | F01D 13/00 |
| 11,104,430 B2* | 8/2021 | Fenny | F16D 25/123 |
| 11,415,044 B2* | 8/2022 | Kupratis | F02C 7/36 |
| 2013/0086919 A1* | 4/2013 | Dooley | B64C 27/12 |
| | | | 60/778 |
| 2015/0322864 A1 | 11/2015 | Dooley et al. | |
| 2016/0003144 A1* | 1/2016 | Kupratis | F02C 7/36 |
| | | | 60/39.15 |
| 2020/0388092 A1 | 12/2020 | Manoukian et al. | |

* cited by examiner

MULTI-ENGINE SYSTEM AND POWER TRANSFER BETWEEN ENGINES THEREOF

TECHNICAL FIELD

The disclosure relates generally to multi-engine systems for aircrafts and methods of controlling such systems.

BACKGROUND

Multi-engine aircrafts such as helicopters are often provided with two or more turboshaft gas turbine engines connected to a main rotor via a common gearbox, and each of the engines is typically capable of providing power greater than what is required for cruising using both/all engines. During normal cruise operating regimes, both engines typically operate at similar power output levels (e.g. each engine provides 50% of the total power output). Attempts have however been made to operate the engines asymmetrically, that is, operating one engine at a higher power than the other. Doing so can provide overall better fuel efficiency. However, the engine operating at lower power needs to be able to rapidly speed back up, when called upon. While such systems are suitable for their intended purposes, improvements are desirable.

SUMMARY

In one aspect, there is provided a multi-engine system for an aircraft, comprising: a first engine having a first output shaft, a first core shaft, and a first electric machine operable as a generator, the first electric machine drivingly engaged by the first output shaft or the first core shaft; a second engine having a second output shaft, a second core shaft, and a second electric machine operable as an electric motor, the second electric machine drivingly engaged to the second core shaft; a reduction gearbox drivingly engaged by the first output shaft and by the second output shaft for driving a common load; and a transmission path between the first engine and the second engine, the transmission path being independent from the reduction gearbox, the transmission path being one or more of: a torque-transfer connection between the second core shaft and the first core shaft or the first output shaft via a coupling gearbox, and an electrical connection between the generator and the electric motor to transmit electrical power generated by the generator to the electric motor to drive the second core shaft.

The multi-engine system described above may include any of the following features, in any combinations.

In some embodiments, the transmission path is the torque-transfer connection.

In some embodiments, the transmission path is the electrical connection.

In some embodiments, the transmission path is both of the torque-transfer connection and the electrical connection.

In some embodiments, the first electric machine is drivingly engaged by the first core shaft.

In some embodiments, the torque-transfer connection is between the second core shaft and the first core shaft via the coupling gearbox.

In some embodiments, the first core shaft is drivingly engaged to the first electric machine via a first accessory gearbox, the second core shaft drivingly engaged to the second electric machine via a second accessory gearbox.

In some embodiments, the torque-transfer connection is between the first accessory gearbox and the second accessory gearbox via the coupling gearbox.

In some embodiments, the coupling gearbox has: a first load path; and a second load path, the second load path independent from the first load path, the coupling gearbox being reversible such that the first core shaft is driving the second core shaft via the first load path and the second core shaft is driving the first core shaft via the second load path.

In some embodiments, the first load path includes a first one-way clutch, the second load path including a second one-way clutch.

In some embodiments, a clutch is between the second core shaft and the first core shaft or the first output shaft, the clutch operable in engaged and disengaged configurations for respectively selectively engaging or disengaging the torque-transfer connection.

In another aspect, there is provided a method of operating a multi-engine system having a first engine and a second engine, the first engine having a first output shaft and a first core shaft, the second engine having a second output shaft and a second core shaft, the first output shaft and the second output shaft drivingly engaged to a common load via a reduction gearbox, the method comprising: receiving a power demand; determining that the power demand is below a power threshold; operating the first engine in a high-power mode; and operating the second engine in a low-power mode by rotating the second core shaft with a torque-transfer connection between the first output shaft or the first core shaft of the first engine and the second core shaft of the second engine independently of the reduction gearbox and/or by rotating the second core shaft with an electrical connection between a generator driven by the first engine and an electric motor driving the second core shaft.

The method may include any of the following features, in any combinations.

In some embodiments, the operating the second engine in the low-power mode includes the rotating of the second core shaft with the torque-transfer connection and with the electrical connection.

In some embodiments, the rotating of the second core shaft with the electrical connection includes drivingly engaging the generator to the first output shaft or the first core shaft via a first accessory gearbox and drivingly engaging the second core shaft with the electric motor via a second accessory gearbox.

In some embodiments, the rotating of the second core shaft with the torque-transfer connection includes drivingly engaging the first output shaft or the first core shaft to the second core shaft via a first accessory gearbox and via second accessory gearbox drivingly engaged to the first accessory gearbox via a coupling gearbox.

In some embodiments, the second core shaft is driven at a different rotational speed than the first core shaft.

In some embodiments, a clutch is engaged from a disengaged configuration to an engaged configuration to drivingly engage the first output shaft or the first core shaft to the second core shaft through the clutch.

In yet another aspect, there is provided a multi-engine system for an aircraft, comprising: a first engine having a first output shaft, a first core shaft, and a first electric machine operable as a generator, the first electric machine drivingly engaged by the first output shaft or the first core shaft; a second engine having a second output shaft, a second core shaft, and a second electric machine operable as an electric motor, the second electric machine drivingly engaged to the second core shaft; a reduction gearbox drivingly engaged by the first output shaft and by the second output shaft for driving a common load; and means for driving the second core shaft with the first core shaft or with the first output shaft independently of the reduction gearbox.

The multi-engine system described above may include any of the following features, in any combinations.

In some embodiments, the means include a coupling gearbox drivingly engaging the second core shaft with the first core shaft or with the first output shaft.

In some embodiments, the means include an electrical connection between the generator driven by the first engine to the electric motor drivingly engaging the second core shaft.

BRIEF DESCRIPTION OF THE DRAWINGS

Reference is now made to the accompanying figures in which.

DETAILED DESCRIPTION

Figure 1:
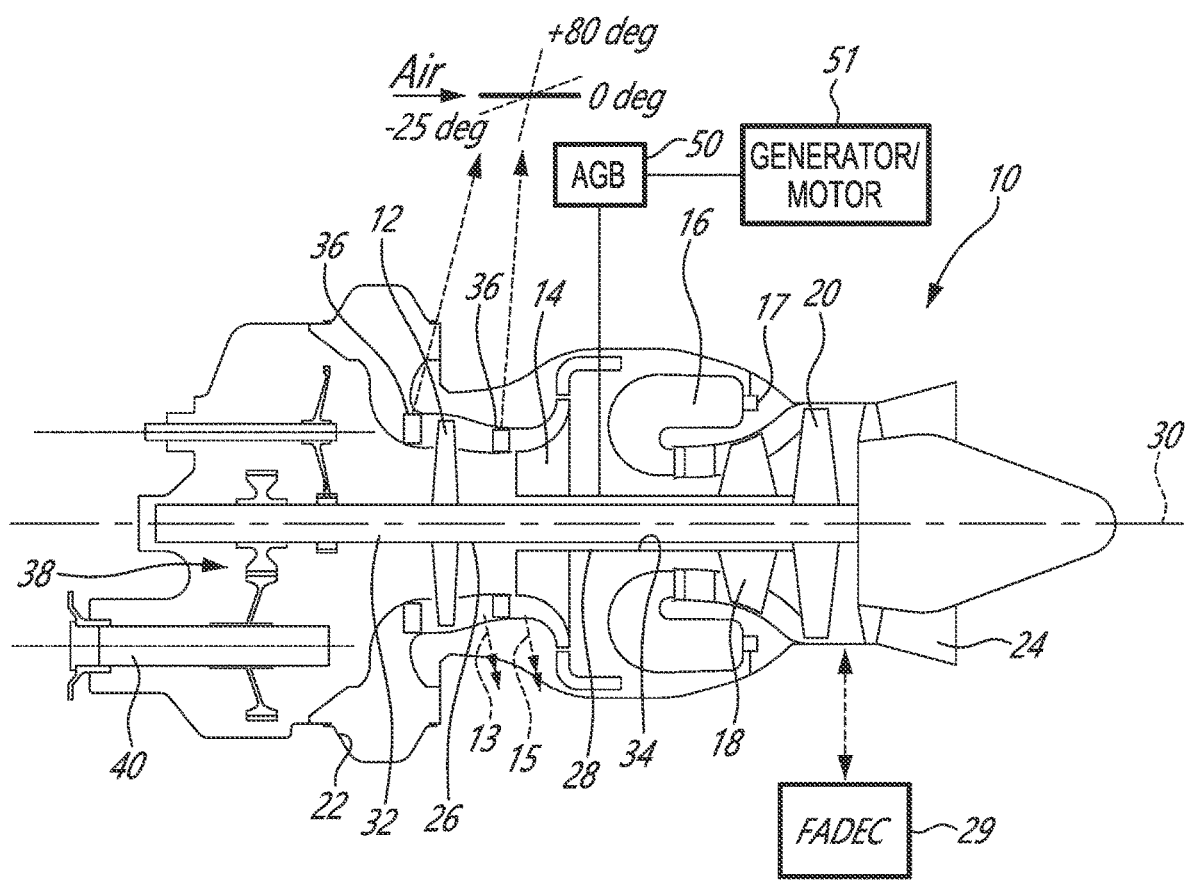
FIG. 1 is a schematic cross sectional view of a gas turbine engine depicted as a turboshaft engine.

FIG. 1 illustrates a gas turbine engine. In this example, the gas turbine engine is a turboshaft engine 10 generally comprising in serial flow communication a low pressure (LP) compressor section, which will be referred below as the LP compressor 12 and a high pressure (HP) compressor section, which will be referred below as the HP compressor 14 for pressurizing air received via an air inlet 22. The air compressed by the LP compressor 12 and by the HP compressor 14 is fed to a combustor 16 in which the compressed air is mixed with a fuel flow, delivered to the combustor 16 via fuel nozzles 17 from fuel system (not depicted), and ignited for generating a stream of hot combustion gases. A high pressure turbine section, which will referred to below as the HP turbine 18, extracts energy from the combustion gases. A low pressure turbine section, which will be referred to below as the LP turbine 20 is located downstream of the HP turbine 18 for further extracting energy from the combustion gases and driving the LP compressor 12. The combustion gases are then exhausted by an exhaust outlet 24.

In the embodiment shown, the turboshaft engine 10 includes a low-pressure spool, referred to below as LP spool 26, and a high-pressure spool, referred to below as a HP spool 28. The LP spool 26 includes a low-pressure shaft, referred to below as LP shaft 32. The HP spool 28 includes a high-pressure shaft, referred to below as HP shaft 34. The HP turbine 18 is drivingly engaged to the HP compressor 14 via the HP shaft 34. The LP turbine 20 is drivingly engaged to the LP compressor 12 via the LP shaft 32. The HP spool 28, and the components mounted thereon, are configured to rotate independently from the LP spool 26 and from the components mounted thereon. These two spools may thus rotate at different speeds about an engine central axis 30. The HP shaft 34 and the LP shaft 32 may be concentric. In the embodiment shown, the HP shaft 34 extends around the LP shaft 32. The term "spool" is herein intended to broadly refer to drivingly connected turbine and compressor rotors, and need not mean the simple shaft arrangements depicted.

In the embodiment shown, the HP compressor 14 rotates at the same speed as the HP turbine 18. And, the LP compressor 12 rotates at the same speed as the LP turbine 20. However, this may not be the case if transmission(s) are provided on the LP spool 26 and HP spool 28 to create speed ratios between the interconnected compressors and turbines. This may increase or decrease rotational speeds of the compressors relative to that of the turbines. Any suitable transmissions may be used for this purpose.

The LP compressor 12 may include one or more compression stages, and the HP compressor 14 may include one or more compression stages. In the embodiment shown in FIG. 1, the LP compressor 12 includes a single compressor stage 12A (FIG. 2), which may include a single mixed flow rotor (MFR), for example such as described in U.S. Pat. No. 6,488,469 B1, entitled "MIXED FLOW AND CENTRIFUGAL COMPRESSOR FOR GAS TURBINE ENGINE", the contents of which are hereby expressly incorporated herein by reference in its entirety.

The turboshaft engine 10 may include a transmission 38 driven by the low pressure shaft 32 and driving a rotatable output shaft 40. The transmission 38 may optionally be provided to vary a ratio between rotational speeds of the low pressure shaft 32 and the output shaft 40.

The LP compressor 12 and the HP compressor 14 are configured to deliver desired respective pressure ratios in use, as will be described further below. The LP compressor 12 may have a bleed valve 13 (shown schematically) which may be configured to selectively bleed air from the LP compressor 12 according to a desired control regime of the engine 10, for example to assist in control of compressor stability. The design of such valve 13 is well known and not described herein in further detail. Any suitable bleed valve arrangement may be used.

As mentioned, the HP compressor 14 is configured to independently rotate from the LP compressor 12 by virtue of their mounting on different engine spools. The HP compressor 14 may include one or more compression stages, such as a single stage, or two or more stages 14A as shown in more detail in FIG. 2. It is contemplated that the HP compressor 14 may include any suitable type and/or configuration of stages. The HP compressor 14 is configured to deliver a desired pressure ratio in use, as will be described further below. The HP compressor 14 may have a bleed valve 15 (shown schematically) which may be configured to selectively bleed air from the HP compressor 14 according to a desired control regime of the engine 10, for example to assist in control of compressor stability. The design of such valve 15 is well known and not described herein in further detail. Any suitable bleed valve arrangement may be used.

In use, suitable one or more controllers 29, such as one or more full authority digital controllers (FADEC) providing full authority digital control of the various relevant parts of the engine 10, controls operation of the engine 10. The FADEC(s) may be provided as for example conventional software and/or hardware, so long as the FADEC(s) is/are configured to perform the various control methods and sequences as described in this document. Each controller 29 may be used to control one or more engines 10 of an aircraft (H). Additionally, in some embodiments the controller(s) 29 may be configured for controlling operation of other elements of the aircraft (H), for instance the main rotor 44.

In the embodiment shown, the turboshaft engine 10 includes an accessory gearbox (AGB) 50 drivingly engaged to an electrical machine, also referred to as a motor/generator 51 via suitable shaft(s) arrangement. The AGB 50 may be driven by the HP shaft 34 or by the LP shaft 32. In the present embodiment, the motor/generator 51 is drivingly engaged by the HP shaft 34 via the AGB 50. The AGB 50 may drive other accessories such pumps and so on.

Figure 2:
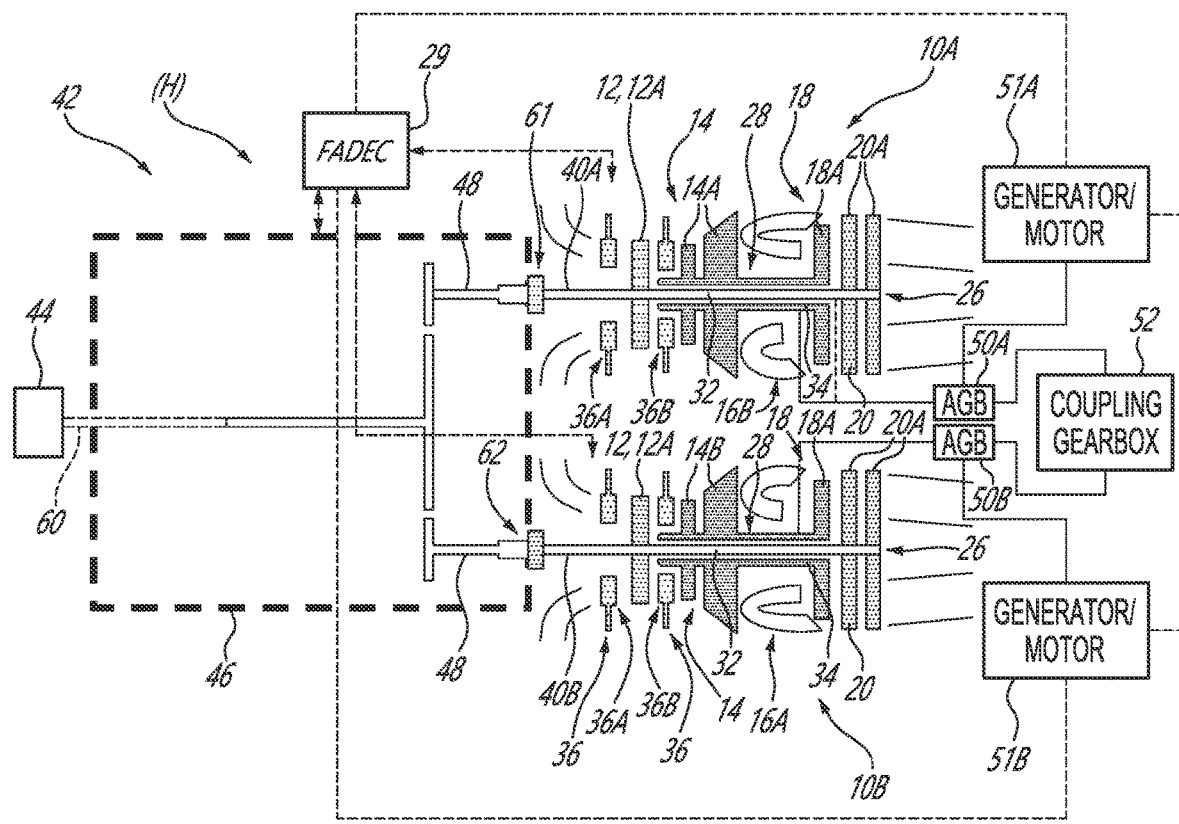
FIG. 2 is a schematic representation of an exemplary multi-engine system, showing two of the FIG. 1 engines.

Referring to FIGS. 1-2, the turboshaft engine 10 may include variable guide vanes (VGVs) 36. In the embodiment shown, a first set of VGVs 36A is located upstream of the LP compressor 12, and a second set of VGVs 36B is located upstream of the HP compressor 14. The VGVs 36 may be independently controlled by suitable one or more controllers 29, as described above. The VGVs 36 may direct inlet air to the corresponding stage of the LP compressor 12 and of the HP compressor 14. The VGVs 36 may be operated to modulate the inlet air flow to the compressors in a manner which may allow for improved control of the output power of the turboshaft engine 10, as described in more detail below. The VGVs 36 may be provided with any suitable operating range. In some embodiments, VGVs 36 may be configured to be positioned and/or modulated between about +80 degrees and about −25 degrees, with 0 degrees being defined as aligned with the inlet air flow, as depicted schematically in FIG. 1. In a more specific embodiment, the VGVs 36 may rotate in a range from +78.5 degrees to −25 degrees, or from +75 degrees to −20 degrees, and more particularly still from 70 degrees to −20 degrees. The two set of VGVs 36 may be configured for a similar range of positions, or other suitable position range.

In some embodiments, the first set of VGVs 36A upstream of the LP compressor 12 may be mechanically decoupled from the second set of VGVs 36B upstream of the HP compressor 14 and downstream of the LP compressor 12, having no mechanical link between the two sets of VGVs to permit independent operation of the respective stages. The VGVs 36 may be operatively controlled by the controller(s) 29 described above, to be operated independently of each other. Indeed, the turboshaft engine 10 is also controlled using controller(s) 29 described above, to carry out the methods described in this document. For the purposes of this document, the term "independently" in respects of the VGVs 36 means that the position of one set of the VGV vanes (e.g. 36A) may be set without effecting any change to a position of the other set of the VGV vanes (e.g. 36B), and vice versa.

Independent control of the VGVs 36 may allow the spools 26, 28 to be operated to reduce or eliminate or reduce aerodynamic coupling between the spools 26, 28. This may permit the spools 26, 28 to be operated at a wider range of speeds than may otherwise be possible. The independent control of the VGVs 36 may allow the spools 26, 28 to be operated at constant speed over a wider operating range, such as from a "standby" speed to a "cruise" power speed, or a higher speed. In some embodiments, independent control of the VGVs 36 may allow the spools 26, 28 to run at speeds close to maximum power. In some embodiments, independent control of the VGVs 36 may also allow one of the spools 26, 28 to run at high speed while the other one run at low speed.

In use, the turboshaft engine 10 is operated by the controller(s) 29 described above to introduce a fuel flow via the nozzles 17 to the combustor 16. Combustion gases turn the HP turbine 18, 18A, 18B and the LP turbine 20, 20A, 20B which in turn drive the HP compressor 14, 14A, 14B and the LP compressor 12, 12A, 12B. The controller(s) 29 control(s) the angular position of VGVs 36 in accordance with a desired control regime, as will be described further below. The speed of the engine 10 is controlled, at least in part, by the delivery of a desired fuel flow rate (e.g., a rate of change of a fuel flow) to the engine, with a lower fuel flow rate causing the turboshaft engine 10 to operate at a lower output speed than a higher fuel flow rate.

Such control strategies may allow for a faster "power recovery" of the turboshaft engine 10 such as when an engine is accelerated from a low output speed to a high output speed, possibly because the spools 26, 28 may be affected relatively less by their inherent inertia through the described use of spool 26, 28 speed control using VGVs 36, as will be further described below. In some embodiments, using the VGVs 36 as described herein, in combination with the use of the LP compressor 12, which may be MFR based, and of the HP compressor 14, which may be MFR based, may provide relatively more air and/or flow control authority and range through the core of the engine 10, and/or quicker power recovery.

Where MFR compressors of the turboshaft engine 10 are provided as described herein, the control of the VGVs 36 may provide for improved stability of engine operation. This may be so even where the VGVs 36 is operated at an extreme end of their ranges, such as in the "closed down" position (e.g. at a position of +80 degrees in one embodiment described herein). This control of the VGVs 36 may facilitate the ability of the turboshaft engine 10 to operate at a very low power setting, such as may be associated with a "standby" mode as described further below herein, wherein the compressor of an engine operating in standby mode is operating in a very low flow and/or low pressure ratio regime.

Turning now to FIG. 2, illustrated is an exemplary multi-engine system 42 that may be used as a power plant for an aircraft, including but not limited to a rotorcraft such as a helicopter (H). The multi-engine system 42 may include two or more engines 10A, 10B. The two engines 10A, 10B may drive a common load via a reduction gearbox 46 and an output shaft 60. Clutches 61, 62 may be used to selectively engage and disengage output shafts 48, 40A, 40B of the engines 10A, 10B to the reduction gearbox 46. In the case of a helicopter application, these engines 10A, 10B will be turboshaft engines such as the turboshaft engine 10 described above with reference to FIG. 1. They may alternatively be any suitable gas turbine engines. Control of the multi-engine system 42 is effected by one or more controller (s) 29, which may be FADEC(s), electronic engine controller(s) (EEC(s)), or the like, that are programmed to manage, as described herein below, the operation of the engines 10A, 10B to reduce an overall fuel burn, particularly during sustained cruise operating regimes, wherein the aircraft is operated at a sustained (steady-state) cruising speed and altitude. The cruise operating regime is typically associated with the operation of prior art engines at equivalent part-power, such that each engine contributes approximately equally to the output power of the system 42. Other phases of a typical helicopter mission would include transient phases like take-off, climb, stationary flight (hovering), approach and landing. Cruise may occur at higher altitudes and higher speeds, or at lower altitudes and speeds, such as during a search phase of a search-and-rescue mission.

In the present description, while the aircraft conditions, such as cruise speed and altitude, are substantially stable, the engines 10A, 10B of the system 42 may be operated asymmetrically, with one engine operated in a high-power "active" mode and the other engine operated in a lower-power "standby" mode. Doing so may provide fuel saving opportunities to the aircraft, however there may be other suitable reasons why the engines are desired to be operated asymmetrically. This operation management may therefore be referred to as an "asymmetric mode" or an "asymmetric operating regime", wherein one of the two engines is operated in a low-power "standby mode" while the other engine is operated in a high-power "active" mode. In such an asymmetric operation, which may be engaged during a cruise phase of flight (continuous, steady-state flight which is typically at a given commanded constant aircraft cruising speed and altitude). The multi-engine system 42 may be used in an aircraft, such as a helicopter, but also has applications in suitable marine and/or industrial applications or other ground operations.

Referring still to FIG. 2, according to the present description the multi-engine system 42 driving a helicopter (H) may be operated in this asymmetric manner, in which a first of the turboshaft engines (say, 10A) may be operated at high power in an active mode and the second of the turboshaft engines, for instance the engine 10B in this example, may be operated in a low-power standby mode. In one example, the first turboshaft engine 10A may be controlled by the controller(s) 29 to run at full (or near-full) power conditions in the active mode, to supply substantially all or all of a required power and/or speed demand of the common load 44. The second turboshaft engine 10B may be controlled by the controller(s) 29 to operate at low-power or no-output-power conditions to supply substantially none or none of a required power and/or speed demand of the common load 44. Optionally, a clutch may be provided to declutch the low-power engine. Controller(s) 29 may control the engine's governing on power according to an appropriate schedule or control regime. The controller(s) 29 may comprise a first controller for controlling the first engine 10A and a second controller for controlling the second engine 10B. The first controller and the second controller may be in communication with each other in order to implement the operations described herein. In some embodiments, a single controller 29 may be used for controlling the first engine 10A and the second engine 10B. The term controller as used herein includes any one of: a single controller controlling the engines, and any suitable combination of multiple controllers controlling the engines, including one or more controllers for each engine, so long as the functionality described in this document is provided.

In another example, an asymmetric operating regime of the engines may be achieved through the one or more controller's 29 differential control of fuel flow to the engines, as described in application Ser. No. 16/535,256, the entire contents of which are incorporated herein by reference. Low fuel flow may also include zero fuel flow in some examples.

Although various differential control between the engines of the engine system 42 are possible, in one particular embodiment the controller(s) 29 may correspondingly control fuel flow rate to each engine 10A, 10B accordingly. In the case of the standby engine, a fuel flow (and/or a fuel flow rate) provided to the standby engine may be controlled to be between 70% and 99.5% less than the fuel flow (and/or the fuel flow rate) provided to the active engine. In the asymmetric mode, the standby engine may be maintained between 70% and 99.5% less than the fuel flow to the active engine. In some embodiments of the method 60, the fuel flow rate difference between the active and standby engines may be controlled to be in a range of 70% and 90% of each other, with fuel flow to the standby engine being 70% to 90% less than the active engine. In some embodiments, the fuel flow rate difference may be controlled to be in a range of 80% and 90%, with fuel flow to the standby engine being 80% to 90% less than the active engine.

In another embodiment, the controller 29 may operate one engine, for instance the engine 10B, of the multiengine system 42 in a standby mode at a power substantially lower than a rated cruise power level of the engine, and in some embodiments at zero output power and in other embodiments less than 10% output power relative to a reference power (provided at a reference fuel flow). Alternately still, in some embodiments, the controller(s) 29 may control the standby engine to operate at a power in a range of 0% to 1% of a rated full-power of the standby engine (i.e. the power output of the second engine to the common gearbox remains between 0% to 1% of a rated full-power of the second engine when the second engine is operating in the standby mode).

In another example, the engine system 42 of FIG. 2 may be operated in an asymmetric operating regime by control of the relative speed of the engines using controller(s) 29, that is, the standby engine is controlled to a target low speed and the active engine is controlled to a target high speed. Such a low speed operation of the standby engine may include, for example, a rotational speed that is less than a typical ground idle speed of the engine (i.e. a "sub-idle" engine speed). Still other control regimes may be available for operating the engines in the asymmetric operating regime, such as control based on a target pressure ratio, or other suitable control parameters.

Although the examples described herein illustrate two engines, asymmetric mode is applicable to more than two engines, whereby at least one of the multiple engines is operated in a low-power standby mode while the remaining engines are operated in the active mode to supply all or substantially all of a required power and/or speed demand of a common load.

In use, the first turboshaft engine (say 10A) may operate in the active mode while the other turboshaft engine, such as the engine 10B, may operate in the standby mode, as described above. During this asymmetric operation, if the helicopter (H) needs a power increase (expected or otherwise), the second turboshaft engine 10B may be required to provide more power relative to the low power conditions of the standby mode, and possibly return immediately to a high- or full-power condition. This may occur, for example, in an emergency condition of the multi-engine system 42 powering the helicopter, wherein the "active" engine loses power the power recovery from the lower power to the high power may take some time. Even absent an emergency, it will be desirable to repower the standby engine to exit the asymmetric mode.

However, maintaining the low-power engine in a stand-by mode requires fuel since combustion is maintained in its combustion chamber. The current disclosure describes systems and methods for coupling the two engines 10A, 10B independently of a reduction gearbox 46 used to drive the main rotor 44. This may provide fuel savings and may reduce recovery time of the low-power engine from the stand-by or low-power mode to the high-power mode.

Still referring to FIG. 2, in the embodiment shown, the first engine 10A includes a first AGB 50A and a first motor/generator 51A. The first motor/generator 51A is drivingly engaged to the HP shaft 34 of the first engine 10A via the first AGB 50A. The first motor/generator 51A may alternatively be drivingly engaged to the LP shaft 32 of the first engine 10A via the first AGB 50A. Similarly, the second engine 10B includes a second AGB 50B and a second motor/generator 51B. The second motor/generator 51B is drivingly engaged to the HP shaft 34 of the second engine 10B via the second AGB 50B. The second motor/generator 51B may alternatively be drivingly engaged to the LP shaft 32 of the second engine 10B via the second AGB 50B. As mentioned above, each of the engines 10A, 10B has its HP shaft 34 rotating independently from its LP shaft 32.

In some cases, the first engine 10A may be operated in a normal or high-power mode whereas the second engine 10B may be operated in idle or a low-power mode. At some point, it may be required to operable both of the engines 10A, 10B in the high-power mode for driving the main rotor 44. This may be required, for instance, if a sudden acceleration is required.

Figure 3:
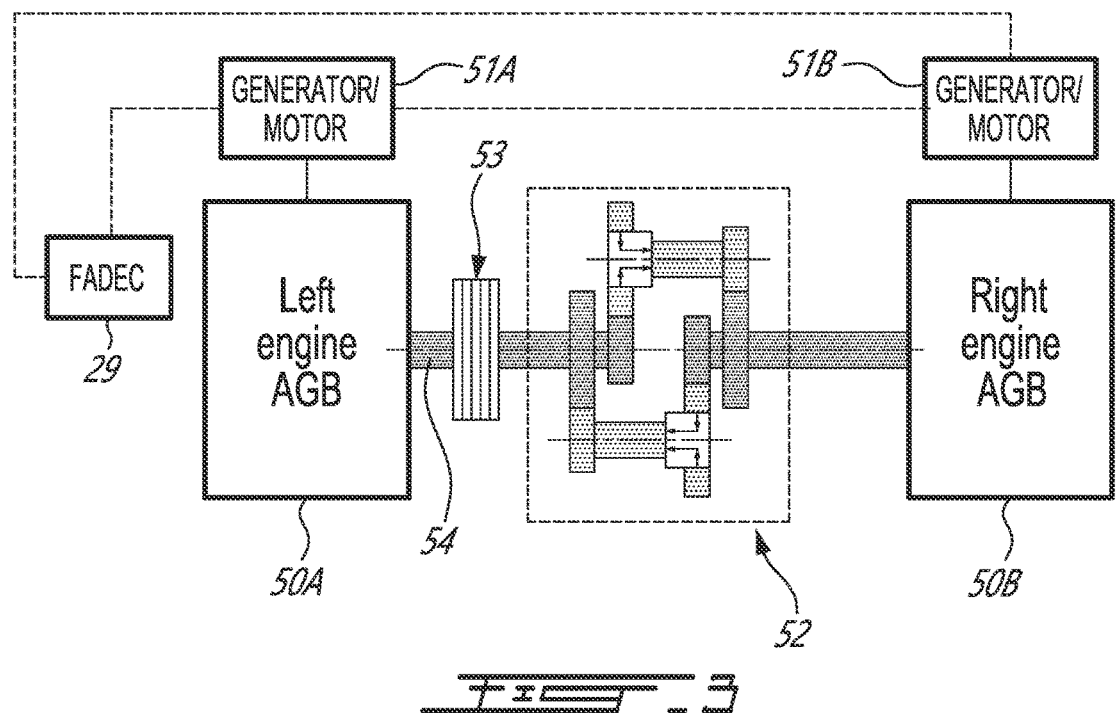
FIG. 3 is a schematic view of a driving engagement between accessory gearboxes of the engines of FIG. 2.

Referring to FIGS. 2-3, the multi-engine system 42 shown in FIG. 2 has a transmission path between the first engine 10A and the second engine 10B that is independent from the reduction gearbox 46 that combines rotational inputs of the LP shafts 32 of the two engines 10A, 10B to drive the main rotor 44 or any other common load. In the present embodiment, the transmission path may be used to allow the first engine 10A to transfer energy to the second engine 10B to help accelerating the second engine 10B to operate it in the high-power mode. This may be done by transmitting a torque from the first engine 10A to the second engine 10B and/or by transmitting electrical power from the first engine 10A to the second engine 10B.

More specifically, the transmission path may include a torque-transfer connection between the HP shaft 34 of the second engine 10B and either one of the HP shaft 34 (connection shown with a solid line in FIG. 2) of the first engine 10A and the LP shaft 32 (connection shown with a dashed line in FIG. 2) of the first engine 10A. In some cases, one or more of the LP shaft 32 and the HP shaft 34 of the first engine 10A may drive the HP shaft 34 of the second engine 10B. The torque-transfer connection is therefore a transfer of torque from a shaft of the first engine 10A to the HP shaft 34 of the second engine 10B to spool up rotation of the second engine 10B for faster response time. A coupling gearbox 52 may be used to drivingly engage the shafts. More detail about this coupling gearbox 52 are provided below.

Alternatively, or in combination, the transmission path may include an electrical connection (dashed line) between the first motor/generator 51A of the first engine 10A, which is operated as a generator, to the second motor/generator 51B of the second engine 10B, which is then operated as an electric motor. The first and second motor/generator 51A, 51B may be operatively connected to the controller 29, which may calibrate how much power is being transmitted between the first and second motor/generators 51A, 51B to minimize fuel consumption of the second engine 10B when it is being operated in the low-power mode. Hence, to drive the low-power engine, the high-power engine may drive the first motor/generator 51A in a generator mode and the electrical power generated by the first motor/generator 51A driven by the high-power engine may power the second motor/generator 51B in a motor mode. The second motor/generator 51B may therefore drive the HP shaft 34 of the low-power engine.

Still referring to FIG. 2, in the depicted embodiment, the torque-transfer connection is created between the HP shaft 34 of the first engine 10A and the HP shaft 34 of the second engine 10B via the coupling gearbox 52. The HP shaft 34 of the first engine 10A may be drivingly engaged to the coupling gearbox 52 via the first AGB 50A. Similarly, the HP shaft 34 of the second engine 10B may be drivingly engaged to the coupling gearbox 52 via the second AGB 50B. Hence, the torque-transfer connection may be between the first AGB 50A and the second AGB 50B via the coupling gearbox 52. Therefore, torque generated by the HP shaft 34 (and/or the LP shaft 32) of the first engine 10A is transmitted to the HP shaft 34 of the second engine 10B via the first AGB 50A, the coupling gearbox 52, and the second AGB 50B.

Referring more particularly to FIG. 3, in the embodiment shown, a clutch 53 is disposed between the HP shaft 34 of the second engine 10B and the LP or HP shaft 32, 34 of the first engine 10A. The clutch 53 is operable in engaged and disengaged configurations for respectively selectively engaging or disengaging the torque-transfer connection. The clutch 53 may be more specifically located between the first AGB 50A and the coupling gearbox 52 on a shaft 54 that drivingly engages the first AGB 50A to the coupling gearbox 52. Any other suitable locations for the clutch 53 are contemplated without departing from the scope of the present disclosure. The clutch 53 may be disengaged when it is not necessary to couple the two engines 10A, 10B together. This may arise in some circumstance, for instance for a cold first engine start where it may be desirable to have the entire starter torque available to accelerate only the HP shaft 34 of the engine that is starting.

Figure 4:
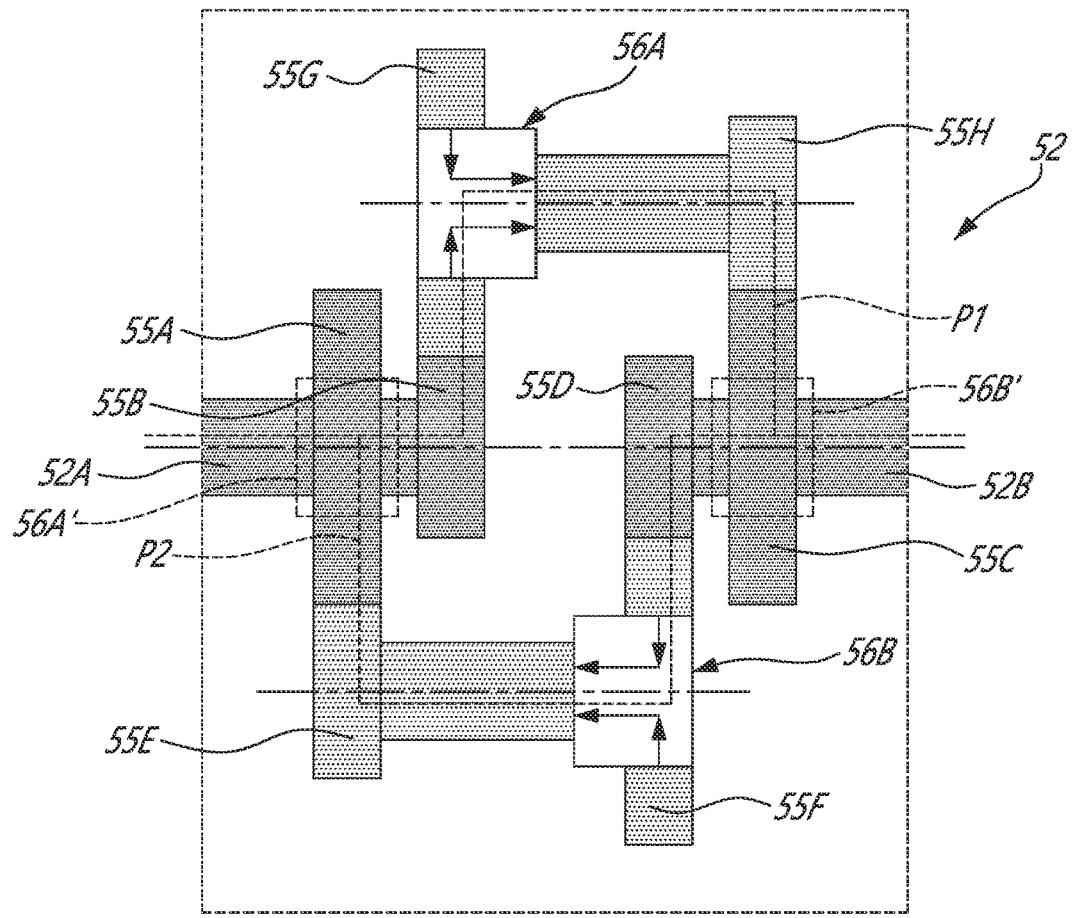
FIG. 4 is an enlarged view of a portion of FIG. 3 illustrating a coupling gearbox.

Referring more particularly to FIG. 4, the coupling gearbox 52 may allow to interchangeably use either one of the first and second engines 10A, 10B as the one being operated in a high-power mode and the other being operated in the low-power mode. This may provide even wearing of the two engines 10A, 10B.

The coupling gearbox 52 has a first input/output 52A that is drivingly engaged to the first engine 10A and a second input/output 52B that drivingly engaged to the second engine 10B. In the present embodiment, the first input/output 52A is drivingly engaged to the first AGB 50A and the second input/output 52B is drivingly engaged to the second AGB 50B.

In use, a speed ratio provided by the coupling gearbox 52 from the first input/output 52A to the second input/output 52B is the same as a speed ratio provided by the coupling gearbox 52 from the second input/output 52B to the first input/output 52A. This may ensure that a speed ratio between the engine being operated in the high-power mode and the engine being operated in low-power mode remains the same whether the first engine 10A or the second engine 10B is being operated in the high-power mode. The reduction in the rotational speed of the engine being operated in low-power mode may be desirable at the low power engine for energy economy reason. Maintaining a stand-by engine ready for fast start-up or fast ramp-up may require less energy as the internal component of the engine rotate at lower speed for an air mass flow lower or equal. Moreover, thermal efficiency of the engine may be less when operated in the low-power mode than in the high-power mode. Hence, the low-power engine may require more fuel flow to rotate the HP shaft 34 of the low-power engine at a low speed than would the high-power engine to rotate the HP shaft 34 of the low-power engine at the same low speed. Hence, using the high-power engine to rotate the HP shaft 34 of the low-power engine may be beneficial for the overall fuel efficiency of an aircraft requiring the low-power engine to be maintained in a operating mode that allow fast re-start or ramp-up in case of emergency power demand.

To this end, the coupling gearbox 52 includes a first load path P1 and a second load path P2 being independent from one another such that a rotational input may be transmitted from the first input/output 52A to the second input/output 52B solely via the first load path P1 and that a rotational input may be transmitted from the second input/output 52B to the first input/output 52A solely via the second load path P2. The first and second load paths P1, P2 are parallel and independent from one another. The coupling gearbox 52 may therefore be reversible such that the HP shaft 34 of the first engine 10A is driving the HP shaft 34 of the second engine 10B via the first load path P1 and the HP shaft 34 of the second engine 10B is driving the HP shaft 34 of the first engine 10A via the second load path P2.

In the depicted embodiment, the coupling gearbox 52 includes gears, namely a first gear 55A driving a second gear 55B being coaxial with the first gear 55A and having a smaller diameter than the first gear 55A. The first gear 55A is driven by the HP shaft 34 of the first engine 10A. The gears include a third gear 55C driving a fourth gear 55D being coaxial with the third gear 55C and having a smaller diameter than the third gear 55C. The third gear 55C is driving the HP shaft 34 of the second engine 10B. The first gear 55A is meshed with a fifth gear 55E having a smaller diameter than the first gear 55A. The fifth gear 55E is coaxial with a sixth gear 55F meshed with the fourth gear 55D. The sixth gear 55F has a greater diameter than the fourth gear 55D and a greater diameter than the fifth gear 55E. The second gear 55B is meshed with a seventh gear 55G having a greater diameter than the second gear 55B. The seventh gear 55G is coaxial with an eighth gear 55H having a smaller diameter than the seventh gear 55G. The eighth gear 55H is meshed with the third gear 55C. The eighth gear 55H has a smaller diameter than the third gear 55C.

The first load path P1 extends from the first gear 55A to the third gear 55C via the second gear 55B, the seventh gear 55G meshed with the second gear 55B, and the eighth gear 55H meshed with the third gear 55C. The second load path P2 extends from the third gear 55C to the first gear 55A via the fourth gear 55D, the sixth gear 55F meshed with the fourth gear 55D, and the fifth gear 55E meshed with the first gear 55A. The first load path P1 includes a first one-way clutch 56A disposed between the seventh gear 55G and the eighth gear 55h. The first one-way clutch 56A allows torque transfer from the first gear 55A to the third gear 55C by permitting a torque transfer from the seventh gear 55G to the eighth gear 55H. The first one-way clutch 56A does not allow torque transfer from the third gear 55C to the first gear 55A via the seventh gear 55G and the eighth gear 55H. The second load path P2 includes a second one-way clutch 56B disposed between the fifth gear 55E and the sixth gear 55F. The second one-way clutch 56B allows torque transfer from the third gear 55C to the first gear 55A by permitting a torque transfer from the sixth gear 55F to the fifth gear 55E. The second one-way clutch 56B does not allow torque transfer from the first gear 55A to the third gear 55C via the fifth gear 55E and the sixth gear 55F. The one-way clutches may be sprag clutches or any other suitable devices that allow torque transfer in a single direction. It will be appreciated that any other suitable gearing arrangements may be used without departing from the scope of the present disclosure. However, any other suitable locations of these one-way clutches are contemplated without departing from the scope of the present disclosure. These one-way clutches may ensure that the two load paths P1, P2 do not work against one another. The two one-way freewheel clutches 56A, 56B may be used to make sure that torque is only permitted to be transferred from the high speed to the low speed engine and not vice versa. Hence, torque transfer from the low power engine to the high power engine is may be prevented thanks to these one-way clutches.

In an alternate embodiment, the first one-way clutch 56A may be located between the first input/output 52A and the first gear 55A. The second one-way clutch 56B may be located between the second input/output 52B and the third gear 55C. In other words, the one-way clutches 56A, 56B could be located at gears 55A and 55C instead of gears 55F and 55G. This may allow running the gears 55E, 55F, 55F and 55G at lower speed when the load path is not passing through them. These alternate locations of the first and second one-way clutches 56A, 56B are shown in dashed lines in FIG. 4 with reference numerals 56A' and 56B'.

The coupling gearbox 52 may be considered as a bi-direction de-multiplication gearbox since it may allow the permutation of which of the two engines 10A, 10B is being operated as the high-power engine. This may ensure that both of the engines 10A, 10B wear at a common rate by being either the high or the low power engine alternatively, from flight to flight. This coupling gearbox 52 may ensure that the HP shaft 34 of either engine is rotating at a speed at least equal or greater than a given reduction ratio of the speed of the other engine. That reduction ratio is determined based on the required engine recovery time, which may depend of the engine architecture. The one-way clutches 56A, 56B may ensure the torque is only able to transfer from the high power engine to the low power engine, when this latter would have tend normally to operate (with the amount of fuel flow provided, or in absence of fuel flow) at a HP shaft speed lower than the high power HP spool time the reduction ratio. In some embodiments, a fuel flow provided to the low-power engine may be zero. Hence, the low-power engine may not consume fuel at all when operated in the low-power mode because its HP shaft 34 is driven by the high-power engine.

The coupling gearbox 52 may be used to create a speed ratio between the HP shafts 34 of the two engines 10A, 10B. For instance, the first engine 10A, which is operated in the high-power mode, may be run at 100% while the second engine 10B operated in the low-power mode may be run at 50% speed. This may allow to even further reduce the amount of fuel required to keep the low power engine running or completely cut the fuel flow and maintain the engine ready for a fast emergency start-up.

In some embodiments, the electrical power fed to the second engine 10B, which is operated in the low-power mode, may be used to reduce a fuel consumption of the second engine 10B required to keep the second engine 10B running. In some cases, the fuel flow to the second engine 10B may be cut and the electrical power may be used to maintain a given rotational speed of the HP shaft 34 of the second engine 10B for fast emergency start-up.

Because the electrical signal may be modulated as required, the required amount of electrical energy may be harvested from the first engine 10A, which is operated in the high-power mode, and/or fed into the second engine 10B, and a control system (e.g., controller 29) may be used to stop/start/balance this electrical energy transfer in the manner most likely to reduce fuel consumption for the low power engine and/or limit power penalties for the high power engine.

In some embodiments, the low-power engine may use a bypass flow path to avoid the air from flowing through the LP compressor 12. The VGVs may be used to seal the main gas path to force the air through the bypass flow path. This is explained in U.S. patent application Ser. No. 17/381,446 filed on Jul. 21, 2021 and Ser. No. 17/383,713 filed on Jul. 23, 2021, the entire contents of which are incorporated herein by reference in their entirety.

Figure 5:
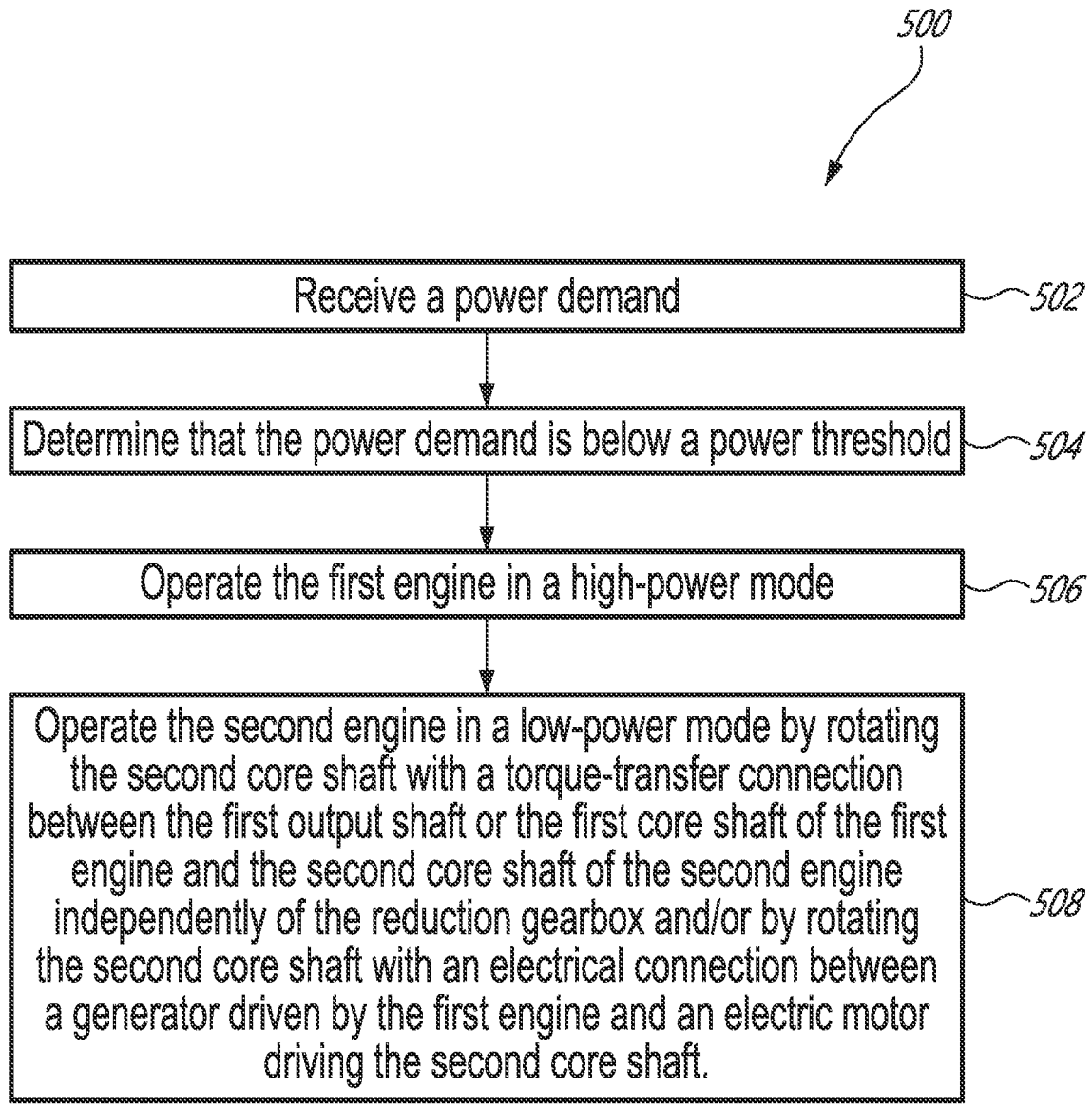
FIG. 5 is a flowchart illustrating steps of a method of operating a multi-engine system as shown in FIG. 2.

Referring now to FIG. 5, a method of operating the multi-engine system 42 is shown at 500. The method 500 includes receiving a power demand at 502; determining that the power demand is below a power threshold at 504;

operating the first engine 10A in a high-power mode at 506; and operating the second engine 10B in a low-power mode by rotating the HP shaft 34 of the second engine 10B with a torque-transfer connection between the LP shaft 32 or the HP shaft 34 of the first engine 10A and the HP shaft 34 of the second engine 10B independently of the reduction gearbox 46 and/or by rotating the HP shaft 34 of the second engine 10B with an electrical connection between the first motor/generator 51A operated as a generator driven by the first engine 10A and the second motor/generator 51B operated as an electric motor driving the HP shaft 34 of the second engine 10B at 508.

In the embodiment shown, the operating the second engine 10B in the low-power mode includes the rotating of the HP shaft 34 of the second engine 10B with the torque-transfer connection and with the electrical connection. The rotating of the HP shaft 34 of the second engine 10B with the electrical connection may include drivingly engaging the generator 51A to the LP shaft 32 of the first engine 10A or the HP shaft 34 of the first engine 10A via the first AGB 50A and drivingly engaging the HP shaft 34 of the second engine 10B with the electric motor 51B via the second AGB 51B.

In the embodiment shown, the rotating of the HP shaft 34 of the second engine 10B with the torque-transfer connection includes drivingly engaging the LP or HP shafts 32, 34 of the first engine 10A to the HP shaft 34 of the second engine 10B via the first AGB 50A and via the second AGB 50B drivingly engaged to the first AGB 50A via the coupling gearbox 52.

In some cases, the HP shaft 34 of the second engine 10B may be rotated at a different rotational speed than the HP shaft 34 of the first engine 10A. The clutch 53 may be engaged to drivingly engage the LP or HP shafts 32, 34 of the first engine 10A to the HP shaft 34 of the second engine 10B through the clutch 53.

Figure 6:
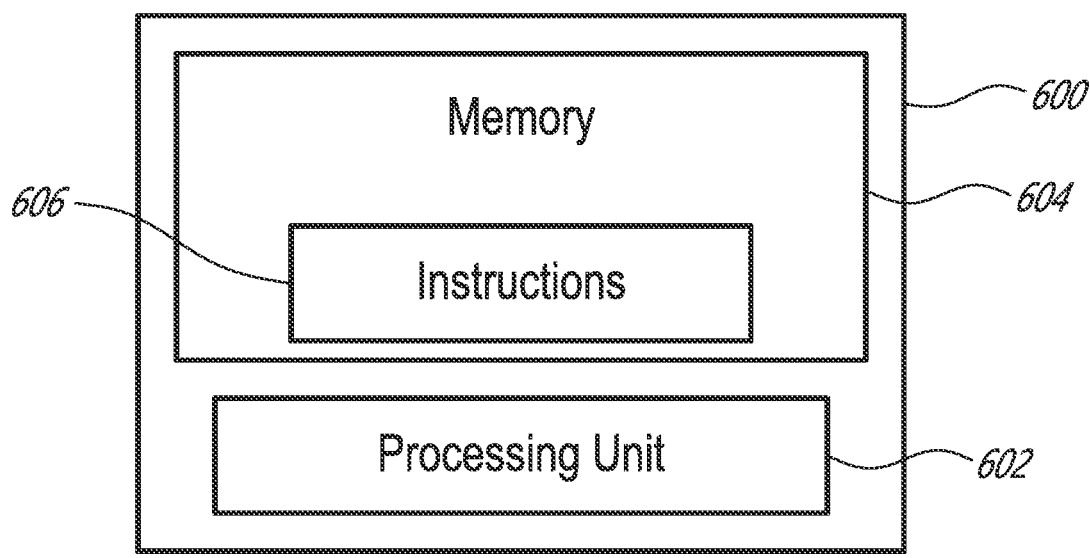
FIG. 6 is a schematic representation of a computing device in accordance with one embodiment.

With reference to FIG. 6, an example of a computing device 600 is illustrated. For simplicity only one computing device 600 is shown but the system may include more computing devices 600 operable to exchange data. The computing devices 600 may be the same or different types of devices. The controller 29 may be implemented with one or more computing devices 600. Note that the controller 29 can be implemented as part of a full-authority digital engine controls (FADEC) or other similar device, including electronic engine control (EEC), engine control unit (ECU), electronic propeller control, propeller control unit, and the like. In some embodiments, the controller 29 is implemented as a Flight Data Acquisition Storage and Transmission system, such as a FAST™ system. The controller 29 may be implemented in part in the FAST™ system and in part in the EEC. Other embodiments may also apply.

The computing device 600 comprises a processing unit 602 and a memory 604 which has stored therein computer-executable instructions 606. The processing unit 602 may comprise any suitable devices configured to implement the method 500 such that instructions 606, when executed by the computing device 600 or other programmable apparatus, may cause the functions/acts/steps performed as part of the method 500 as described herein to be executed. The processing unit 602 may comprise, for example, any type of general-purpose microprocessor or microcontroller, a digital signal processing (DSP) processor, a central processing unit (CPU), an integrated circuit, a field programmable gate array (FPGA), a reconfigurable processor, other suitably programmed or programmable logic circuits, or any combination thereof.

The memory 604 may comprise any suitable known or other machine-readable storage medium. The memory 604 may comprise non-transitory computer readable storage medium, for example, but not limited to, an electronic, magnetic, optical, electromagnetic, infrared, or semiconductor system, apparatus, or device, or any suitable combination of the foregoing. The memory 604 may include a suitable combination of any type of computer memory that is located either internally or externally to device, for example random-access memory (RAM), read-only memory (ROM), compact disc read-only memory (CDROM), electro-optical memory, magneto-optical memory, erasable programmable read-only memory (EPROM), and electrically-erasable programmable read-only memory (EEPROM), Ferroelectric RAM (FRAM) or the like. Memory 604 may comprise any storage means (e.g., devices) suitable for retrievably storing machine-readable instructions 606 executable by processing unit 602.

The methods and systems for operating the multi-engine system described herein may be implemented in a high level procedural or object oriented programming or scripting language, or a combination thereof, to communicate with or assist in the operation of a computer system, for example the computing device 600. Alternatively, the methods and systems for operating the multi-engine system may be implemented in assembly or machine language. The language may be a compiled or interpreted language. Program code for implementing the methods and systems for operating the multi-engine system may be stored on a storage media or a device, for example a ROM, a magnetic disk, an optical disc, a flash drive, or any other suitable storage media or device. The program code may be readable by a general or special-purpose programmable computer for configuring and operating the computer when the storage media or device is read by the computer to perform the procedures described herein. Embodiments of the methods and systems for operating the multi-engine system may also be considered to be implemented by way of a non-transitory computer-readable storage medium having a computer program stored thereon. The computer program may comprise computer-readable instructions which cause a computer, or more specifically the processing unit 602 of the computing device 600, to operate in a specific and predefined manner to perform the functions described herein, for example those described in the method 500.

Computer-executable instructions may be in many forms, including program modules, executed by one or more computers or other devices. Generally, program modules include routines, programs, objects, components, data structures, etc., that perform particular tasks or implement particular abstract data types. Typically the functionality of the program modules may be combined or distributed as desired in various embodiments.

The embodiments described herein are implemented by physical computer hardware, including computing devices, servers, receivers, transmitters, processors, memory, displays, and networks. The embodiments described herein provide useful physical machines and particularly configured computer hardware arrangements. The embodiments described herein are directed to electronic machines and methods implemented by electronic machines adapted for processing and transforming electromagnetic signals which represent various types of information. The embodiments described herein pervasively and integrally relate to machines, and their uses; and the embodiments described herein have no meaning or practical applicability outside their use with computer hardware, machines, and various hardware components. Substituting the physical hardware particularly configured to implement various acts for non-physical hardware, using mental steps for example, may substantially affect the way the embodiments work. Such computer hardware limitations are clearly essential elements of the embodiments described herein, and they cannot be omitted or substituted for mental means without having a material effect on the operation and structure of the embodiments described herein. The computer hardware is essential to implement the various embodiments described herein and is not merely used to perform steps expeditiously and in an efficient manner.

The term "connected" or "coupled to" may include both direct coupling (in which two elements that are coupled to each other contact each other) and indirect coupling (in which at least one additional element is located between the two elements).

The technical solution of embodiments may be in the form of a software product. The software product may be stored in a non-volatile or non-transitory storage medium, which can be a compact disk read-only memory (CD-ROM), a USB flash disk, or a removable hard disk. The software product includes a number of instructions that enable a computer device (personal computer, server, or network device) to execute the methods provided by the embodiments.

The embodiments described in this document provide non-limiting examples of possible implementations of the present technology. Upon review of the present disclosure, a person of ordinary skill in the art will recognize that changes may be made to the embodiments described herein without departing from the scope of the present technology. Yet further modifications could be implemented by a person of ordinary skill in the art in view of the present disclosure, which modifications would be within the scope of the present technology.

The invention claimed is:

1. A multi-engine system for an aircraft, comprising:
a first engine having a first output shaft, a first core shaft, and a first electric machine operable as a generator, the first electric machine drivingly engaged by the first output shaft or the first core shaft;
a second engine having a second output shaft, a second core shaft, and a second electric machine operable as an electric motor, the second electric machine drivingly engaged to the second core shaft;
a reduction gearbox drivingly engaged by the first output shaft and by the second output shaft for driving a common load; and
a transmission path between the first engine and the second engine, the transmission path being independent from the reduction gearbox, the transmission path being one or more of:
a torque-transfer connection via a coupling gearbox, the coupling gearbox having a first load path and a second load path independent from the first load path, the coupling gearbox being reversible such that the first core shaft and/or the first output shaft is engageable to the second core shaft via the first load path, the second core shaft and/or the second output shaft is engageable to the first core shaft via the second load path, and
an electrical connection between the generator and the electric motor to transmit electrical power generated by the generator to the electric motor to drive the second core shaft.

2. The multi-engine system of claim 1, wherein the transmission path is the torque-transfer connection.

3. The multi-engine system of claim 1, wherein the transmission path is the electrical connection.

4. The multi-engine system of claim 1, wherein the transmission path is both of the torque-transfer connection and the electrical connection.

5. The multi-engine system of claim 1, wherein the first electric machine is drivingly engaged by the first core shaft.

6. The multi-engine system of claim 1, wherein the torque-transfer connection is between the second core shaft and the first core shaft via the coupling gearbox.

7. The multi-engine system of claim 1, wherein the first core shaft is drivingly engaged to the first electric machine via a first accessory gearbox, the second core shaft drivingly engaged to the second electric machine via a second accessory gearbox.

8. The multi-engine system of claim 7, wherein the torque-transfer connection is between the first accessory gearbox and the second accessory gearbox via the coupling gearbox.

9. The multi-engine system of claim 1, wherein
the coupling gearbox engages the first core shaft to the second core shaft via the first load path and engages the second core shaft to the first core shaft via the second load path.

10. The multi-engine system of claim 9, wherein the first load path includes a first one-way clutch, the second load path including a second one-way clutch.

11. The multi-engine system of claim 1, comprising a clutch between the second core shaft and the first core shaft or the first output shaft, the clutch operable in engaged and disengaged configurations for respectively selectively engaging or disengaging the torque-transfer connection.

12. A method of operating a multi-engine system having a first engine and a second engine, the first engine having a first output shaft and a first core shaft, the second engine having a second output shaft and a second core shaft, the first output shaft and the second output shaft drivingly engaged to a common load via a reduction gearbox, the method comprising:
receiving a power demand;
determining that the power demand is below a power threshold;
operating the first engine in a high-power mode; and
operating the second engine in a low-power mode by rotating the second core shaft with a torque-transfer connection between the first output shaft or the first core shaft of the first engine and the second core shaft of the second engine independently of the reduction gearbox, including operating the second engine in the low-power mode with the torque-transfer connection through a coupling gearbox having a first load path and a second load path independent from the first load path, the coupling gearbox being reversible such that the first core shaft and/or the first output shaft is engageable to the second core shaft via the first load path, the second core shaft and/or the second output shaft is engageable to the first core shaft via the second load path, and/or by rotating the second core shaft with an electrical connection between a generator driven by the first engine and an electric motor driving the second core shaft.

13. The method of claim 12, wherein the operating the second engine in the low-power mode includes the rotating of the second core shaft with the torque-transfer connection and with the electrical connection.

14. The method of claim 12, wherein the rotating of the second core shaft with the electrical connection includes drivingly engaging the generator to the first output shaft or the first core shaft via a first accessory gearbox and drivingly engaging the second core shaft with the electric motor via a second accessory gearbox.

15. The method of claim 12, wherein the rotating of the second core shaft with the torque-transfer connection includes drivingly engaging the first output shaft or the first core shaft to the second core shaft via a first accessory gearbox and via second accessory gearbox drivingly engaged to the first accessory gearbox via the coupling gearbox.

16. The method of claim 15, comprising driving the second core shaft at a different rotational speed than the first core shaft.

17. The method of claim 12, comprising engaging a clutch from a disengaged configuration to an engaged configuration to drivingly engage the first output shaft or the first core shaft to the second core shaft through the clutch.

18. A multi-engine system for an aircraft, comprising:
a first engine having a first output shaft, a first core shaft, and a first electric machine operable as a generator, the first electric machine drivingly engaged by the first output shaft or the first core shaft;
a second engine having a second output shaft, a second core shaft, and a second electric machine operable as an electric motor, the second electric machine drivingly engaged to the second core shaft;
a reduction gearbox drivingly engaged by the first output shaft and by the second output shaft for driving a common load; and
means for driving the second core shaft with the first core shaft or with the first output shaft independently of the reduction gearbox, the means including a coupling gearbox having a first load path and a second load path independent from the first load path, the coupling gearbox being reversible such that the first core shaft and/or the first output shaft is engageable to the second core shaft via the first load path, the second core shaft and/or the second output shaft is engageable to the first core shaft via the second load path.

19. The multi-engine system of claim 18, wherein the means include the coupling gearbox drivingly engaging the second core shaft with the first core shaft.

20. The multi-engine system of claim 18, wherein the means further include an electrical connection between the generator driven by the first engine to the electric motor drivingly engaging the second core shaft.

* * * * *